UNITED STATES PATENT OFFICE.

ADOLF SEYLER, OF BROOKLYN, NEW YORK.

IMPROVEMENT IN THE MANUFACTURE OF PAPER-PULP AND PAPER FROM GRASSES.

Specification forming part of Letters Patent No. 218,324, dated August 5, 1879; application filed April 4, 1879.

*To all whom it may concern:*

Be it known that I, ADOLF SEYLER, of Brooklyn, Kings county, State of New York, have invented certain new and useful Improvements in the Manufacture of Paper-Pulp and Paper from Grasses, of which the following is a specification.

The leading feature of my invention may be stated to consist in the manufacture of paper or paper-pulp from common field, lawn, or meadow grasses, when taken in a fresh or green condition; and the invention further consists in the specific process employed, as hereinafter fully set forth.

In the manufacture of paper from plants heretofore they have been generally used, with some exceptions, when in a matured and dry condition; and this has been especially the case wherever the use of grasses has been heretofore attempted. My invention shows, however, that when grasses are treated for the production of pulp while in a fresh green condition a most important improvement in the quality of the pulp results.

Flax or linen, as is well known, has been heretofore found to be the best material for paper-making, its analysis showing the smallest percentage of ash.

Now, according to my experiments, an analysis of the common grasses shows a percentage of ash more closely approaching that of flax than other materials ordinarily used for the manufacture of paper. Thus, while flax will give from two and three-tenths parts to four and one-tenth parts of ash, grass will give from two and eight-tenths to five and three-tenths parts, while the straw of the different cereals gives from three and eight-tenths parts to six parts of ash. It is therefore found that grass, after flax, is one of the best materials for paper-making; but grass, when fully matured and dry, has not such a fiber in strength, fineness, or flexibility as can compare with flax; but when, according to my invention, the grass is used when fresh and green, and reduced to pulp in this state, its fiber is found to be very flexible and silky, as well as long and tenacious, so that paper produced from it closely approaches in every way to linen paper, and, if anything, possesses greater softness and transparency.

In carrying out my invention, I therefore employ any of the common field, lawn, or meadow grasses, commonly known as "grass," and for the purposes of my invention it is best that the grass should be cut or mowed before it begins to bloom; but young or old may be used, so long as the sap is yet in circulation and the chlorophyl, silica, and other organic and inorganic matters are not dried in, which is found to make a serious change in the quality of the fiber for the purpose of paper.

After the grass is cut or mown, it is passed between the rollers of a "roller-press," which squeeze out the main portion of the sap and crush or loosen the fiber.

The sap should be conducted into a suitable receptacle, and may be afterward distributed over the ground from which the grass was taken, for which it will serve as a fertilizer. If, however, the factory is a good distance from where the grass is cut, the grass may be pressed into bales, similar to hay, and thus shipped to the factory.

When the grass has been passed through the roller-press, as above mentioned, it is next placed in a large tank of water, in which it is thoroughly washed, by agitation or other suitable means, so as to remove the dirt, which usually consists of adhering earthy matters.

The water of the tank may be either warm or cold, and the tank is constructed with a perforated "false bottom," on which the crushed grass rests, and through which the dirt falls into the compartment below, from which a pipe extends to allow the dirt and wash-water to escape. When the crushed grass is thus sufficiently washed, it is then boiled in an open kettle or in a steam-kettle with lye in proportions of about, say, one-tenth of a pound of caustic soda or two-tenths of a pound of caustic potash, or six-tenths of lime, to one hundred pounds of grass. The boiling is continued, when an open kettle is used, for from four to five hours; but when a steam-kettle is used, two hours will suffice. After the boiling operation is completed, the material is removed from the kettle and put into a feltering-trough, in which it is beaten and feltered from one to two hours. After this it is washed until cleaned in clear water.

The coarse pulp or felt thus produced is refined and bleached for the production of fine papers, as follows: It is first placed in a cold solution of carbonate of soda for about fifteen minutes; next in a dilute solution of sulphuric acid for about the same time, and again in a solution of carbonate of soda; fourthly, it is placed in a solution of chloride of magnesia for about thirty minutes, and after this it is placed a third time in a solution of carbonate of soda; and, finally, a second time in a solution of sulphuric acid. These operations may be repeated more or less till the pulp is as fine and white as required, after which it is finally washed in clear water.

Another method is to felter the crude pulp with water-glass and bleach it with a solution of chloride of lime or chloride of soda. Still another is to bleach the crude pulp in chlorine gas, then in a solution of chloride of soda, and finish with water-glass, after which the pulp is washed with clear water.

I do not, however, confine myself to any special process of refining and bleaching the green-grass fiber, for this may be effected in various ways; and, indeed, all kinds of paper can be produced from this material by appropriate treatment. Thus, it can be made into felt for ice-houses, or for other non-conducting purposes, for insoles for boots and shoes, &c. It can be made to imitate ivory or leather, to furnish the finest tissue, drawing, and writing papers, and paper for cuffs and collars, and also for cigarettes. It can even be made into a pure natural paper, without the use of lye or other chemicals, for the purpose of medicated paper, and which is believed to be the only paper made containing only natural materials.

Papers produced from this green-grass pulp possess the qualities of great strength and length of fiber, tenacity, softness, and flexibility. For tissue, drawing, writing, and copying papers, the material is admirably adapted, as it provides a fine writing-surface and superior transparency even without the use of any size.

The economy of this material may be indicated by its inexpensive and easily obtainable character, and the little waste that occurs therefrom. Thus one square foot of ground gives in the whole year from seven-tenths to one and five-tenths of a pound of green grass, making from thirty thousand four hundred and ninety-two to sixty-five thousand three hundred and forty pounds to the acre. One pound of green grass makes one-fourth to one-sixth pound dried, or eleven thousand nine hundred and seventy-nine pounds dried grass to an acre. Finally, one pound of dried grass gives about one-third to one-fourth pound of fine bleached and finished paper, or two thousand nine hundred and eleven pounds of finished paper to the acre of ground.

I am aware that it has sometimes been proposed to use the plants commonly employed for paper-making while in a green state, as indicated in the Patent No. 31,814, of 1861; but I am not aware that common green grass has ever been used for paper-making previous to my invention, for which it presents many important advantages over the plants commonly used for this purpose; and, furthermore, the processes which I employ for reducing the green grass to crude and to finished pulp are distinct from what has been heretofore employed.

What I claim as my invention is—

1. Paper or paper-pulp produced from common field, lawn, or meadow grasses, cut and treated while in a fresh and green condition, substantially as herein set forth.

2. The process herein described for producing paper or paper-pulp from grasses—viz., cutting the grass while in a fresh or green condition, squeezing out the sap therefrom, and crushing the fibers, washing, macerating, or boiling and felting the same, substantially as herein set forth.

3. The process herein described for refining and bleaching paper-pulp—viz., placing the crude pulp alternately in solutions of carbonate of soda and sulphuric acid, and intermediately in a bleaching chloride or chlorine solutions, substantially as herein set forth.

ADOLF SEYLER.

Witnesses:
CHRISTIAN H. MOLLER,
CHAS. M. HIGGINS.